US011962891B2

(12) United States Patent
Su et al.

(10) Patent No.: US 11,962,891 B2
(45) Date of Patent: Apr. 16, 2024

(54) IMAGE PREVIEW METHOD AND APPARATUS, ELECTRONIC DEVICE, AND STORAGE MEDIUM (71) Applicant: Beijing SuperHexa Century Technology CO. Ltd., Beijing (CN)

(72) Inventors: Shaohua Su, Beijing (CN); Yuquan Dong, Beijing (CN)

(73) Assignee: BEIJING SUPERHEXA CENTURY TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/377,171

(22) Filed: Jul. 15, 2021

(65) Prior Publication Data
US 2022/0286623 A1 Sep. 8, 2022

(30) Foreign Application Priority Data
Mar. 3, 2021 (CN) .......................... 202110236249.2

(51) Int. Cl.
*H04N 5/262* (2006.01)
*H04N 23/60* (2023.01)
*H04N 23/63* (2023.01)

(52) U.S. Cl.
CPC ......... *H04N 23/635* (2023.01); *H04N 5/2628* (2013.01); *H04N 23/64* (2023.01)

(58) Field of Classification Search
CPC ......... H04N 5/232945; H04N 5/23222; H04N 5/2628; B65G 2203/041; G01S 3/7865;
(Continued)

(56) References Cited

U.S. PATENT DOCUMENTS

2007/0025723 A1* 2/2007 Baudisch ............... H04N 5/262
348/E5.051
2013/0265311 A1* 10/2013 Na ............................ G06T 3/40
345/428
(Continued)

FOREIGN PATENT DOCUMENTS

CN 106796344 A 5/2017
EP 3291533 A1 3/2018

OTHER PUBLICATIONS

Search Report of the parallel EP application No. 21186993.8.
Second Office Action of the priority CN application.

*Primary Examiner* — Thai Q Tran
*Assistant Examiner* — Nienru Yang
(74) *Attorney, Agent, or Firm* — J.C. PATENTS (57) ABSTRACT The present disclosure provides an image preview method and apparatus, an electronic device and a storage medium, where the method may include: determining a target object contained in a first image captured by the camera; cropping an image area containing the target object; and enlarging the image area to a predefined preview size, and previewing and displaying the enlarged image area in a shooting preview interface. Through the above method, a target object can be determined in a complex shooting scenario, and a user may observe the target object more clearly through a preview interface when an area where the target object is located is automatically enlarged and displayed, further avoiding the problem that it is difficult for the user to find the target object through movement of the head-mounted device due to an undersized field of view of an enlarged image area.

16 Claims, 7 Drawing Sheets (58) Field of Classification Search
CPC . G06F 3/013; G06T 7/20; G06T 7/207; G06T 7/292
USPC .......................................................... 348/169
See application file for complete search history.

(56) References Cited

U.S. PATENT DOCUMENTS

| | | |
|---|---|---|
| 2014/0267803 A1 | 9/2014 | Shintani |
| 2016/0103483 A1* | 4/2016 | Raffle ................. G02B 27/0093 345/156 |
| 2017/0223261 A1 | 8/2017 | Shimizu |
| 2018/0052595 A1* | 2/2018 | Parmar ............... G06F 3/04815 |
| 2020/0169660 A1* | 5/2020 | Kim ................... H04N 5/23212 |
| 2020/0329193 A1 | 10/2020 | Selig |
| 2021/0004595 A1* | 1/2021 | Du ..................... H04N 5/23222 |

* cited by examiner

IMAGE PREVIEW METHOD AND APPARATUS, ELECTRONIC DEVICE, AND STORAGE MEDIUM

CROSS-REFERENCE TO RELATED APPLICATIONS

This application claims priority to Chinese Application No. CN 202110236249.2, filed on Mar. 3, 2021, which is hereby incorporated by reference in its entirety. ☐

TECHNICAL FIELD

The present disclosure relates to the field of electronic technology and, in particular, to an image preview method and apparatus, an electronic device, and a storage medium.

BACKGROUND

With the development of smart electronic devices, head-mounted devices have become a choice for more and more users. A head-mounted device at the present stage is generally equipped with a shooting function. When a user is performing shooting, since the head-mounted device is worn on the user's head, compared with mobile phones, cameras and other handheld devices equipped with a shooting function, it is difficult to aim a lens at a target object to be shot due to movement of the lens resulting from the user's head rotation or other movement since the user can be easily influenced by factors such as vision, hearing, smell, etc. If the target object is lost, the user needs to repeatedly search for the target object to be shot, thereby deteriorating user experience.

SUMMARY

In view of this, the present disclosure provides an image preview method and apparatus, an electronic device, and a storage medium.

Specifically, the present disclosure is implemented through the following technical solutions.

According to a first aspect of the present disclosure, provided is an image preview method applied to a head-mounted device provided with a camera, including:

determining a target object contained in a first image captured by the camera;

cropping an image area containing the target object; and enlarging the image area to a predefined preview size, and previewing and displaying the enlarged image area in a shooting preview interface.

According to a second aspect of the present application, provided is an image preview apparatus applied to a head-mounted device provided with a camera, including:

a determining unit, configured to determine a target object contained in a first image captured by the camera;

a cropping unit, configured to crop an image area containing the target object; and a previewing unit, configured to enlarge the image area to a predefined preview size, and preview and display the enlarged image area in a shooting preview interface.

According to a third aspect of the present application, provided is an electronic device, including:

a processor; and a memory for storing instructions executable by the processor;

where the processor runs the executable instructions to implement the method in the embodiment of the first aspect as described above.

According to a fourth aspect of the present application, provided is a computer-readable storage medium, storing thereon computer instructions executable by a processor to implement the method in the embodiment of the first aspect as described above.

It can be seen from the above technical solutions provided in the present disclosure, through determining a target object and then cropping the area where the target object is located to enlarge and display the area containing the target object, the target object can be determined in a complex shooting scenario; and through enlarging and displaying the area where the target object is located, a user may observe the target object more clearly through a preview interface and then perform shooting at a proper time; especially for a dynamic target object, a current state of the target object can be observed in the preview interface in real time without moving the head along with the movement trajectory of the target object all the time, so that a most satisfactory image can be captured, thereby avoiding a situation where the target object is lost due to an improper head movement or a situation where a shooting opportunity is missed due to inability to accurately observe a real-time state of the target object. Compared with moving after manually enlarging the area where the target object is located, the user's operation step is saved, further avoiding the problem that it is difficult to find the target object due to an undersized field of view of the enlarged image area.

BRIEF DESCRIPTION OF DRAWINGS

The accompanying drawings herein, are incorporated into the specification and constitute a part of the specification, illustrate embodiments that are consistent with the present disclosure and are used to explain principles of the present disclosure together with the specification.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless indicated otherwise. Implementations described in the following exemplary embodiments do not represent all implementations that are consistent with the present disclosure. Instead, they are merely examples of apparatuses and methods that are consistent with some aspects of the present disclosure as detailed in the appended claims.

The terms used in the present disclosure are merely for the purpose of describing specific embodiments, but are not intended to limit the present application. A singular form such as "a", "the" and "this" used in the present disclosure and the appended claims is also intended to include a plural form unless other meanings are explicitly indicated in the context. It will also be appreciated that the term "and/or" as used herein refers to and includes any of or all of possible combinations of one or more associated items listed.

It will be appreciated that although the terms such as "first", "second", "third" and the like may be used in the present disclosure to describe various information, such information should not be limited to these terms. These terms are only used to distinguish information of the same type. For example, without departing from the scope of the present disclosure, first information may also be referred to as second information; similarly, second information may also be referred to as first information. Depending on the context, the word "if" as used herein can be interpreted as "once . . . " or "when . . . " or "in response to a determination"

The embodiments of the present disclosure will be described in detail in the following.

Figure 1:
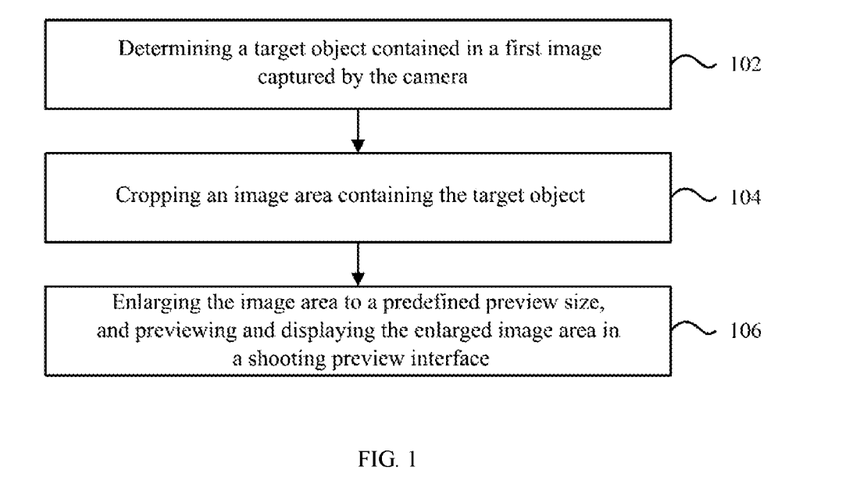
FIG. 1 is a flowchart of an image preview method according to an exemplary embodiment of the present disclosure.

FIG. 1 is a flow chart of an image preview method according to an exemplary embodiment of the present disclosure. The method is applied to a head-mounted device provided with at least one camera, and the head-mounted device may be in the form of glasses, a helmet, a hat, etc. The head-mounted device is not limited in the present disclosure with regard to its specific form. With reference to FIG. 1, the above method may include the following steps.

Step 102, determining a target object contained in a first image captured by the camera.

In an embodiment, a target object selected by a user may be determined through a detected user-triggered operation. For example, the head-mounted device may display a preview image captured by a current lens to the user. When the user enables a shooting function but does not start shooting, that is, when the user is in a shooting preview function, the interface displayed in front of the user may be termed as a shooting preview interface, a preview image captured by a current camera is displayed in the shooting preview interface, and the preview image described above is termed as a first image. The user may directly click, in the preview image, a target object to be shot through a touch operation; or, an area coverage selected by the user through a click operation or a drag operation is used as a target object; or, the head-mounted device may perform eye-tracking on the user in order to determine the user's focus point on the preview image, and when the gaze stays for a preset time, the object where the gaze stays is determined as a target object; or, the head-mounted device may determine a target object according to received dictation from the user, for example, the user only needs to dictate "a pine tree", and then the head-mounted device may determine the "a pine tree" in the preview image as a target object based on semantic analysis and image content analysis; or, according to an object characteristic preset in the head-mounted device, a target object that matches the object characteristic may also be determined. For example, the head-mounted device is preset with object characteristics, such as human body characteristics, building characteristics, natural scene characteristics, etc., when the head-mounted device is in the shooting preview function, if the lens captures a scene that matches a preset object characteristic, it may be automatically determined as the target object. It should be understood that the method for determining the target object is only illustratively described here, the present disclosure is not limited thereto.

In an embodiment, the target object includes a dynamic object whose position is movable, a static object whose position is stationary, and/or a position area selected by the user in the preview interface. It is worth noting that, when shooting previews, the head-mounted device may continuously acquire a current preview image. The frequency at which the preview images are acquired depends on the performance of the head-mounted device, or may be customized according to engineering empirical values. Once a preview image is acquired, a target object contained in the current preview image is determined. Through the above manner, real-time tracking of the target object can be achieved regardless of whether the user moves the camera or whether the target object is moving, such that the area where the target object is located is kept enlarged and displayed in the following steps.

In an embodiment, there may be one or more target objects, which is not limited in the present disclosure. For example, the head-mounted device is preset with multiple object characteristics, multiple scenes that match a preset object characteristic are captured by a lens under a shooting function, the multiple scenes may be automatically determined as target objects, and the following steps are performed for the target objects respectively.

In the above-mentioned embodiments, the present disclosure provides multiple ways to determine a target object, and the user can select a most suitable way to determine a target object so that needs of different users are met.

Step 104, cropping an image area containing the target object.

In an embodiment, an image area where the target object is located may be cropped, so that the image area can be enlarged and displayed in a subsequent step. The size of the above image area can be adjusted according to the size of the target object. The image area needs to contain the target object. However, when the target object selected by the user is a part of the image area in the shooting preview interface, the image area selected by the user or a larger image area containing the image area selected by the user may be directly cropped.

Step 106, enlarging the image area to a predefined preview size, and previewing and displaying the enlarged image area in a shooting preview interface.

In an embodiment, the image area cropped in the above step may be enlarged to a predefined size and displayed in the shooting preview interface for the user. The above-mentioned predefined size can be flexibly adjusted. For example, the cropped image area can be directly enlarged to the maximum size of the preview interface of the user, that is, the above-mentioned image area is displayed in full screen. In the above-mentioned embodiment, the target object may be determined in real time and the target object may be enlarged and displayed, which realizes automatic real-time tracking as well as enlarging and displaying of the target object, thereby avoiding the problem that the difficulty in tracking the target object is increased due to a narrowed field of view resulting from that the user manually enlarges the target object for display.

In an embodiment, the first image may be displayed while the image area is being displayed, and the target object may be marked in the first image. For example, a "picture in picture" style may be used to display the image area and the first image simultaneously, where the display area of the first image may be a preset fixed area or a changeable area that can be moved, scaled, or closed according to user operations. The size of the first image may be flexibly adjusted or using a default size directly. For example, the head-mounted device may display the first image and the image area simultaneously in a default state. When the image area and the first image are displayed using the "picture in picture" style, the image area may be used as a primary image for display, and the first image is overlaid on the upper left corner of the preview interface to form a "picture in picture". When the image area displayed in the preview interface is partially blocked by the first image, the user, if in a desire to observe the blocked part, may drag the display area of the first image to move the first image towards the lower right corner of the preview interface or another position for display. In addition, the target object may be marked in the first image, for example, the position of the target object may be marked by means of a selecting frame, an arrow, or color alteration of the target object. For example, the head-mounted device displays the first image and the image area simultaneously in a default state, where the image area is used as a primary image for display, and the first image is overlaid on the upper left corner of the preview interface, and the target object may be marked in the first image on the upper left corner to indicate the position of the target object in the image captured by the current camera. Under a circumstance where the target object is moving, it is convenient for the user to move the camera in time according to the position of the target object, so that the camera can continuously capture the target object.

In an embodiment, a determination may be made with regard to whether the target object is about to move out of the first image according to movement information of the target object. For example, under a circumstance where the target object is movable, when the target object moves in any direction and is about to exceed the viewfinder coverage corresponding to the first image, a first prompt message may be generated. The first prompt message may indicate the user to move the head in any direction, so that the target object is maintained in the viewfinder coverage corresponding to the first image, and thus the head-mounted device may mark the target object in the first image, and enlarge and display it. It is worth noting that the above-mentioned first prompt message may be a visualized message displayed in the preview interface, such as an arrow or texts indicating a movement direction, or may be a prompt message in the form of sound or vibration, or may be a combination of any of the above-mentioned prompting manners, and likewise the second prompt message described in the following steps. The prompt messages are not limited in the present disclosure with regard to their specific forms. In addition, when determining whether the target object is about to exceed the first image, the determination may be made based on whether the target object is close to the edge of the first image, or the determination may be made based on whether the area of the target object within the first image is less than a preset percentage of the total area of the target object, or the determination may be made in combination with information such as a speed or an acceleration at which the target object is moving. For example, when the area of the target object within the first image is less than 80%, it is determined that the target object is about to exceed the viewfinder coverage corresponding to the first image.

In an embodiment, a second prompt message is generated under a circumstance where the target object moves out of the first image. For example, a determination with regard to whether the target object moves out of the first image may be made based on a percentage of the target object within the first image, for example, when the area of the target object within the first image is less than 50% of the total area of the target object, it can be determined that the target object has moved out of the viewfinder coverage of the first image. At this point, the second prompt message may be generated to indicate the user to move the head-mounted device in such a way that a first image re-captured by the head-mounted device after moving contains the target object.

In an embodiment, device movement information recorded by a posture sensor carried in the head-mounted device may be acquired, where the device movement information is used to record a corresponding historical device movement direction of the head-mounted device when the target object moves out of the first image; and a second prompt message containing a first movement direction is generated, where the first movement direction is an opposite direction of the historical device movement direction. Where the posture sensor may include motion sensors such as a three-axis gyroscope, a three-axis accelerometer, a three-axis electronic compass, etc., which record information such as a movement angle, a movement direction, a movement distance of the head-mounted device or the like. In an actual shooting operation where the user wears the head-mounted device to perform shooting, the target object may be moved out of the shooting range of the lens every now and then due to various factors such as shooting jitters or an overlength moving distance. At this point, the historical movement direction of the head-mounted device when the target object moves out of the viewfinder coverage of the first image can be determined, and the user is prompted to move the head-mounted device in an opposite direction, that is, to move the head-mounted device back to a position where the target object can be captured, so that the user moves the head-mounted device to re-acquire the first image containing the target object.

In an embodiment, object movement information of the target object may be acquired, where the object movement information is used to record a corresponding historical object movement direction of the target object when it moves out of the first image; and a second prompt message containing a second movement direction is generated, where the second movement direction is a same direction as the historical object movement direction. When the target object is a person or thing that is movable, the movement direction of the target object when the target object moves out of the viewfinder coverage of the first image may be determined according to the movement trajectory of the target object, and the user is prompted to move the head-mounted device towards a same direction of the movement direction of the target object, that is, to move the head-mounted device to follow the movement trajectory of the target object, so that the camera can re-capture the first image containing the target object.

In an embodiment, a second image containing the target object may be acquired under a circumstance where the target object moves out of the first image, where the second image has a wider field of view than that of the first image; and a second prompt message is generated according to the second image In an embodiment, acquiring the second image containing the target object captured by the head-mounted device may include: acquiring the second image shot with a relatively wider field of view at a historical moment by a zoom camera currently used by the head-mounted device; where the first image is an image captured by the zoom camera with a relatively narrower field of view, and an interval period between the historical moment and the current moment is shorter than a preset period threshold, or a moving distance or a rotation angle generated by the target object and/or the head-mounted device between the historical moment and the current moment is less than a preset threshold to ensure that the acquired second image is of sufficient reference. The head-mounted device, on determining that the target object has moved out of the first image, may generate a prompt message according to the second image to remind the user to move the head-mounted device according to the prompt message, so that the first image captured after the user moves the head-mounted device contains the target object.

In an embodiment, when the head-mounted device is equipped with multiple cameras, assuming that each of the cameras has a different field of view, the wider the field of view is, the wider the viewfinder coverage is, and the narrower the field of view is, the narrower the viewfinder coverage is; if an image captured by a current camera is termed as a first image, when the target object moves out of the viewfinder coverage of the current camera, a second image, which contains the target object and is captured by another camera, may be used, and the above-mentioned another camera has a wider field of view than the field of view used by the camera collecting the first image. At this point, the user may be indicated to move the head-mounted device according to the position of the target object in the acquired second image, so that the first image re-captured by the current camera contains the target object, moreover, the above-mentioned second image may be captured by the further camera at a historical moment, or captured by the further camera at a current moment. If a second image captured at a historical moment is used, an interval period between the historical moment and the current moment is shorter than a preset period threshold, or a moving distance or a rotation angle of the target object and/or the head-mounted device between the historical moment and the current moment is less than a preset threshold to ensure that the acquired second image is of sufficient reference.

It is worth noting that the second image captured by the head-mounted device may be a single-frame picture, a video, or a real-time preview image output by a camera. For example, a single-frame picture shot with a relatively wider field of view at a historical moment by a zoom camera carried in the head-mounted device is used as the second image, and a real-time preview image captured with a relatively narrower field of view at a current moment is used as the first image; or, the head-mounted device carries a first camera having a relatively narrower field of view and a second camera having a relatively wider field of view, where the first camera and the second camera capture images simultaneously, a preview image captured by the first camera is used as the first image, and a video image captured by the second camera at a historical moment is used as the second image. Also, it will be appreciated that "acquiring a second image" in the above embodiment does not mean "shooting a second image", instead, the shooting action may be completed earlier, or may be performed after it is determined that the first image does not contain the target object. The present disclosure does not limit the time point at which the second image is captured.

In an embodiment, the second image may also be an image captured by a camera equipped on a further head-mounted device. For example, different head-mounted devices may use short-range wireless communication technologies to communicate data. When the target object moves out of the first image captured by any head-mounted device used by the user, a further head-mounted device that can communicate with this head-mounted device may be searched in real time and a connection therewith is established, or a successfully established connection is directly used to acquire a second image captured by the further head-mounted device, if the second image captured by the further head-mounted device contains the target object, the position of the target object may be determined according to the above-mentioned second image, and then second prompt message is generated to indicate the user to move the head-mounted device to re-acquire the first image containing the target object; or, an association relationship between head-mounted devices is pre-established, when the target object moves out of a first image captured by any head-mounted device used by the user, priority is given to an associated device with which the association relationship has already been established to acquire a second image containing the target object, if the acquiring fails, to acquire the second image from a further head-mounted device with which the association relationship has not yet been established, the present disclosure does not specifically limit how to communicate data between the head-mounted devices.

It is worth noting that the first image and the enlarged image area may be displayed in the preview interface simultaneously, moreover, the above-mentioned first prompt message and second prompt message may be displayed either in the image area or in the first image. Since the enlarged image area has a narrower field of view, displaying a prompt message in the first image will achieve an effect that the user is prompted more accurately to move the head-mounted device.

It can be seen from the above technical solutions provided in the present disclosure, through determining a target object and then cropping the area where the target object is located to enlarge and display the area containing the target object, the target object can be determined in a complex shooting scenario; and through enlarging and displaying the area where the target object is located, a user may observe the target object more clearly through a preview interface and then perform shooting at a proper time; especially for a dynamic target object, a current state of the target object can be observed in the preview interface in real time without moving the head along with the movement trajectory of the target object all the time, so that a most satisfactory image can be captured, thereby avoiding a situation where the target object is lost due to an improper head movement or a situation where a shooting opportunity is missed due to inability to accurately observe a real-time state of the target object. Compared with moving after manually enlarging the area where the target object is located, the user's operation step is saved, also avoiding the problem that it is difficult to find the target object due to an undersized field of view of the enlarged image area. Additionally, when the target object moves out of or is about to move out of the first image, it is determined based on movement information of the target object or movement information of the head-mounted device according to the present disclosure, how to move the head-mounted device at the current moment for the purpose to re-capture the target object, and the prompt message generated finally can accurately indicate the user to move the head-mounted device, thereby further avoiding the problem that it is difficult for the user to capture the target object due to inability to accurately determine a movement direction.

Figure 2:
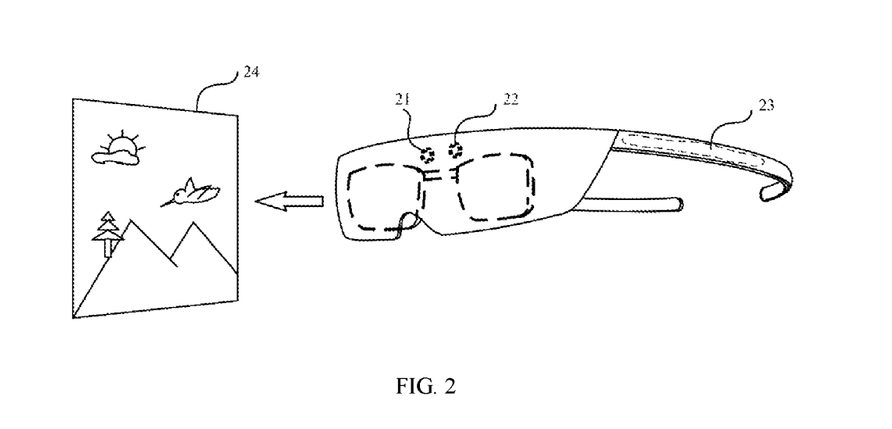
FIG. 2 is a schematic diagram of a head-mounted device applied in an embodiment of the present disclosure.

A head-mounted device in a type of smart glasses as shown in FIG. 2 is equipped with two cameras, which are respectively a camera 21 and a camera 22. The above-mentioned cameras may be arranged in the middle of the head-mounted device as shown in the figure, or arranged on both sides of the head-mounted device, or at any position of the head-mounted device. different cameras may be intensively arranged in one place or dispersedly arranged in different positions of the head-mounted device, and the head-mounted device is not specially limited in the present disclosure with regard to installation positions and number of cameras thereon; its frame has a touch area 23 arranged thereon, with touch and slide operations in the touch area 23, the user can trigger, close, and adjust various functions or parameters set on the head-mounted device, for example, a target object or an area where the target object is located may be selected through a click or drag operation in the touch area, and an image captured using the head-mounted device camera is denoted with 24.

Figure 3:
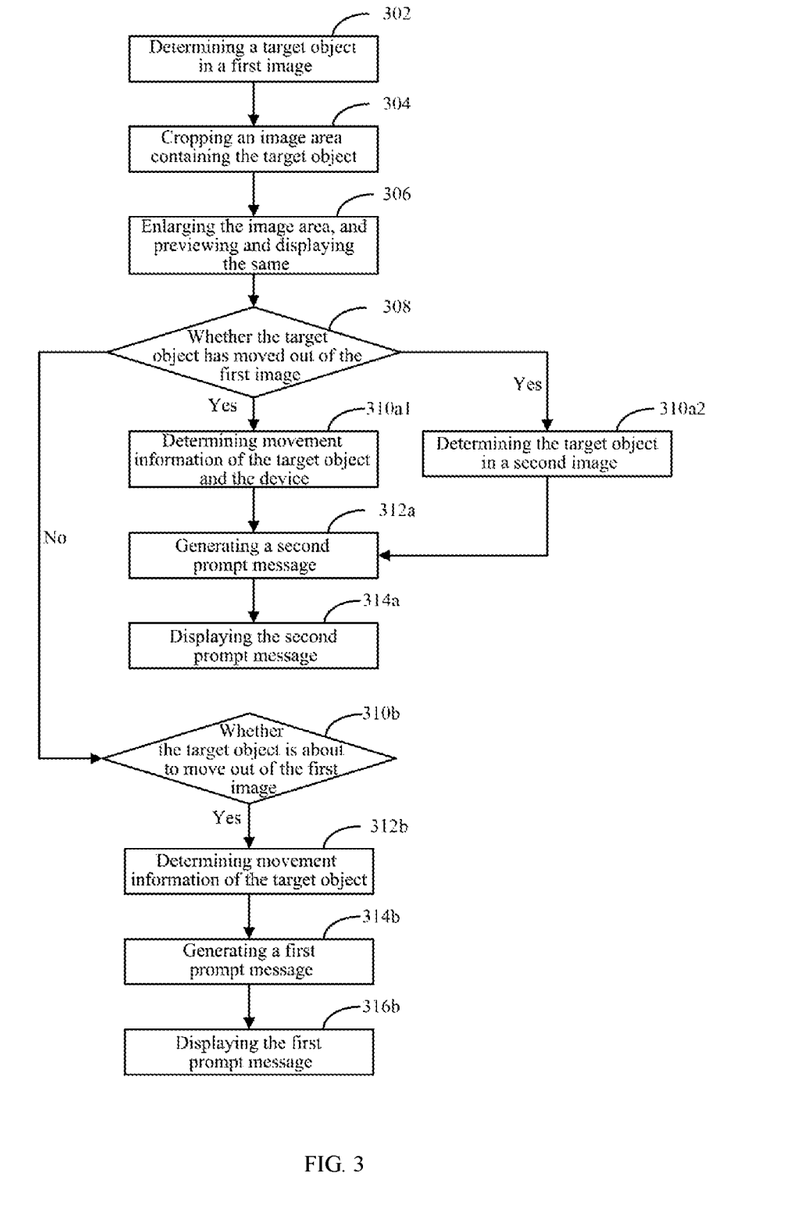
FIG. 3 is a specific flowchart of an image preview method according to an exemplary embodiment of the present disclosure.

FIG. 3 is a flowchart of an image preview method according to an exemplary embodiment of the present disclosure. The above-mentioned method may include the following steps. The steps will be described in detail hereunder with reference to FIG. 2 and FIG. 3.

Step 302, determining a target object in a first image.

Figure 4:
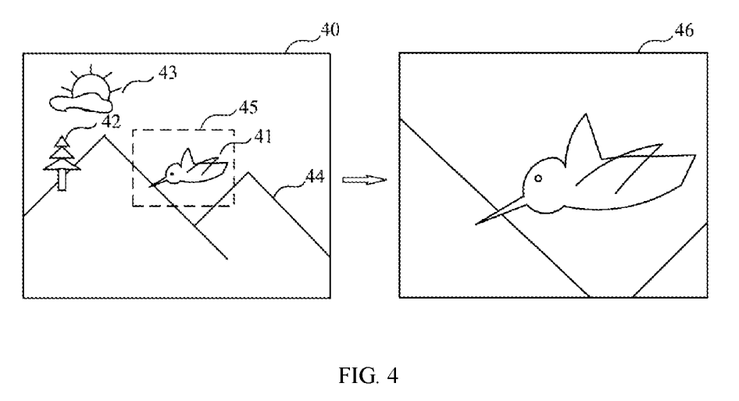
FIG. 4 is a schematic diagram illustrating a first image preview method according to an exemplary embodiment of the present disclosure.

As shown in FIG. 2, assuming that the head-mounted device currently uses a camera 21 for shooting preview, the first image shown as 24 is captured as a preview image under the viewfinder coverage corresponding to the current field of view of the camera 21; in order to be more intuitive, an image 40 in FIG. 4 is used to represent a current image captured by the camera 21. As shown in 40, it contains an object 41 "bird", an object 42 "tree", an object 43 "sun" and objects 44 "mountains". Assuming that the user desires to use 41 as a target object, at this point, the user may click 41 through a touch operation in the touch area 23, or perform a frame selection on 41 through a drag operation, so that the head-mounted device determines 41 to be the target object; or the user may set a "bird" label, when the head-mounted device identifies the object 41 in the first image, it may directly determine 41 to be the target object; or, the user may dictate "birds", and the head-mounted device, on collecting voice information of the user, matches the content dictated by the user with objects in the first image and subsequently determines 41 that matches the "birds" as the target object.

Step 304, cropping an image area containing the target object. In this step, an image area containing the target object in the first image may be cropped. The size of the image area may be a default value or may be flexibly adjusted according to the user's drag; as shown in FIG. 4, assuming that the target object determined by the user is 41 and the target object 41 is contained in the dashed box 45, at this point, the image area in the dashed box 45 can be cropped, and Step 306 is subsequently executed.

Figure 5:
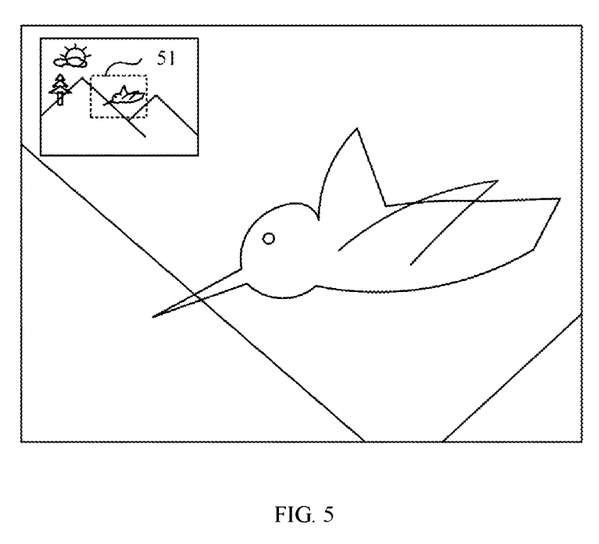
FIG. 5 is a schematic diagram illustrating a second image preview method according to an exemplary embodiment of the present disclosure.

Step 306, enlarging the image area, and previewing and displaying the same. In this step, as shown in image 46 on the right side of FIG. 4, the image area 45 cropped in Step 306 may be enlarged. For example, the image area 45 may be enlarged to a size of a shooting preview interface of the head-mounted device to obtain an image 46, and the image 46 is displayed in the shooting preview interface of the head-mounted device, so that the user can observe the target object 41 more clearly through the image 46. It is worth noting that the first image 40 may be displayed in the image 46, and the target object may be marked in the first image 40. The display area of the first image 40 may be a preset fixed area or a changeable area that can be moved, scaled, or closed according to user operations. The size of the first image 40 may be flexibly adjusted or using a default size directly. As shown in FIG. 5, the head-mounted device may display the first image and the enlarged image area simultaneously in a default state, and the enlarged image area may be used as a primary image for display, and the first image is overlaid on the upper left corner of the preview interface to form a "picture in picture" display style. When the enlarged image area is partially blocked by the first image, the user, if in a desire to observe the blocked part, may drag the display area of the first image to move the first image towards the lower right corner of the preview interface or another position for display. In addition, the target object may be marked in the first image, as shown in a dashed box 51 of FIG. 5, the position of the target object may be marked in any manner such as a selecting frame or the like to indicate the position of the target object in the first image captured by the camera 21. Under a circumstance where the target object is moving, it is convenient for the user to move the camera in time according to the position of the target object, so that the camera can continuously capture the target object.

Step 308, determining whether the target object has moved out of the first image.

Figure 6:
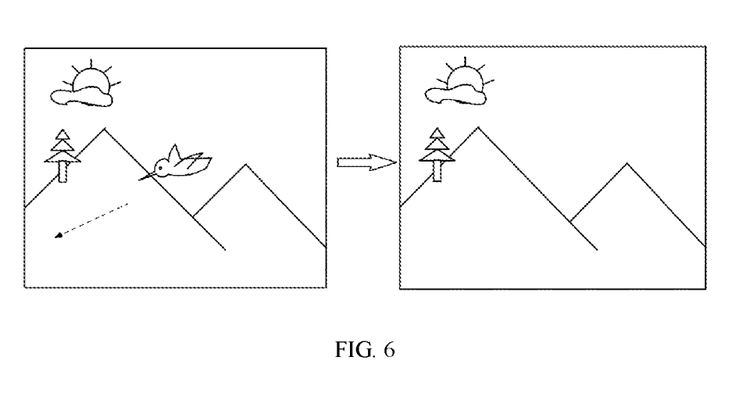
FIG. 6 is a schematic diagram illustrating a third image preview method according to an exemplary embodiment of the present disclosure.
Figure 7:
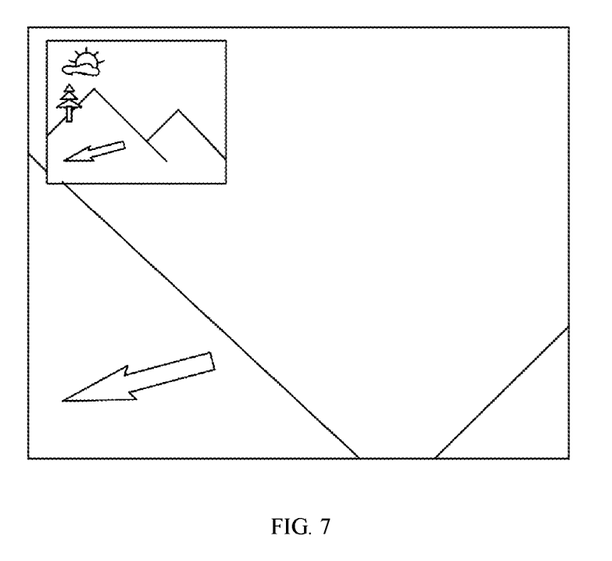
FIG. 7 is a schematic diagram illustrating a fourth image preview method according to an exemplary embodiment of the present disclosure.

If the target object has moved out of the first image, as shown in FIG. 6, assuming that the target object 41 moved out of the first image for the reason that the target object 41 itself moved in the direction of the dashed arrow as shown in the figure and finally moved out of the first image, Step 310a1 may be executed to acquire movement information of the target object 41. The above-mentioned movement information is used to record the historical movement direction of the target object 41 when it moves out of the first image, that is, the direction indicated by the dashed arrow in FIG. 6; then Step 312a is executed to generate a second prompt message containing a second movement direction, where the second movement direction may be a same direction as the direction indicated by the dashed arrow in FIG. 6; moreover, the prompt message can be displayed on the enlarged image area, as shown in FIG. 7, the arrow may be used to prompt the user to move the head-mounted device in the direction of arrow, or a text reminder message may be displayed on the interface, e.g., "Please move in the direction of the arrow", to further remind the user of the direction in which to move the head-mounted device, meanwhile the prompt message may be displayed in the first image that is displayed simultaneously with the enlarged image area in order to further help the user better control the angle or the direction in which to move the head-mounted device.

Figure 8:
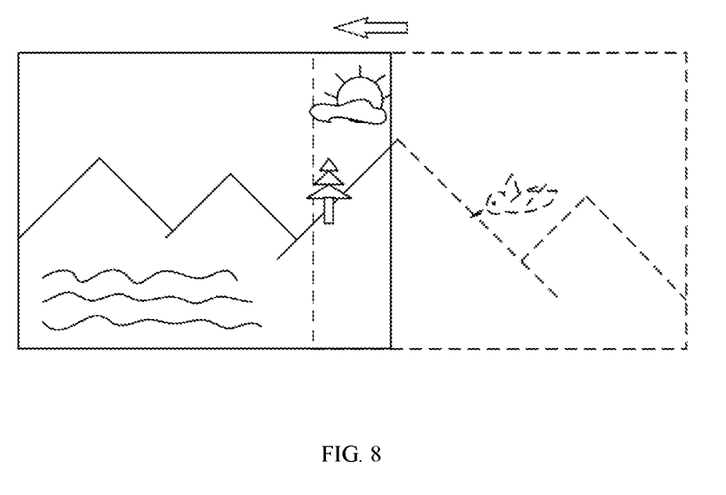
FIG. 8 is a schematic diagram illustrating a fifth image preview method according to an exemplary embodiment of the present disclosure.
Figure 9:
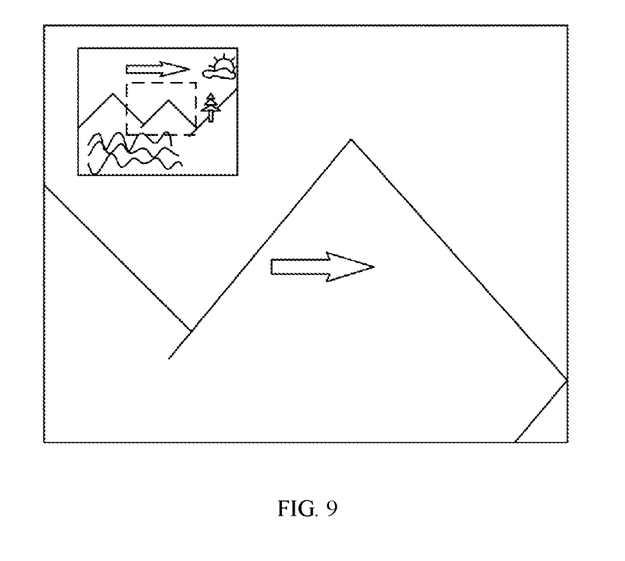
FIG. 9 is a schematic diagram illustrating a sixth image preview method according to an exemplary embodiment of the present disclosure.

If the target object has moved out of the first image, as shown in FIG. 8, assuming that the target object 41 moved out of the first image for the reason that the user wearing the head-mounted device moved the device so that the first image captured by the camera 21 moved leftward along the direction of arrow shown in FIG. 8 and eventually the first image captured by the camera 21 does not contain the target object, where the dotted line in FIG. 8 is the first image captured by the camera 21 prior to movement of the head-mounted device and the solid line in FIG. 8 is the first image captured by the camera 21 subsequent to movement of the head-mounted device. Step 310a1 may be executed to acquire movement information of the head-mounted device. The above-mentioned movement information is used to record the historical movement direction of the head-mounted device, that is, the direction indicated by the arrow in FIG. 8; then Step 312a is executed to generate a second prompt message containing a first movement direction, where the first movement direction may be an opposite direction of the direction indicated by the arrow in FIG. 8; moreover, the prompt message may be displayed on the enlarged image area, as shown in FIG. 9, the arrow shown may be used to prompt the user to move the head-mounted device in the direction of arrow, or a text reminder message may be displayed on the interface, e.g., "Please move in the direction of arrow", to further remind the user of the direction in which to move the head-mounted device, meanwhile the prompt message may be displayed in the first image that is displayed simultaneously with the enlarged image area in order to further help the user better control the angle or the direction in which to move the head-mounted device.

It is worth noting that in an actual application process, there may be a case where the target object and the head-mounted device move simultaneously. In the above case, the movement direction of the target object and the movement direction of the device may be determined respectively, and then the two determined directions are performed with a comprehensive calculation to derive a finally determined direction according to which the user is reminded to move the head-mounted device.

In addition, if the target object has moved out of the first image, Step 310a2 may be executed. If a field of view used by the camera 22 is greater than that of the camera 21, the viewfinder coverage of the camera 22 will be wider than that of the camera 21, thus the camera 22 may capture a second image containing the target object. At this point, the second image captured by the camera 22 may be used. When the second image contains the target object, a second prompt message may be generated according to the second image to remind the user to move according to the second prompt message, where the second image may be an image captured by the camera 22 at a current moment or an image captured at a historical moment. If it is captured at a historical moment, an interval period between the historical moment and the current moment is not longer than a preset threshold, or a moving distance or a rotation angle of the target object or the head-mounted device between the historical moment and the current moment is less than a preset threshold to ensure that the second image is of a sufficient reference value.

Figure 10:
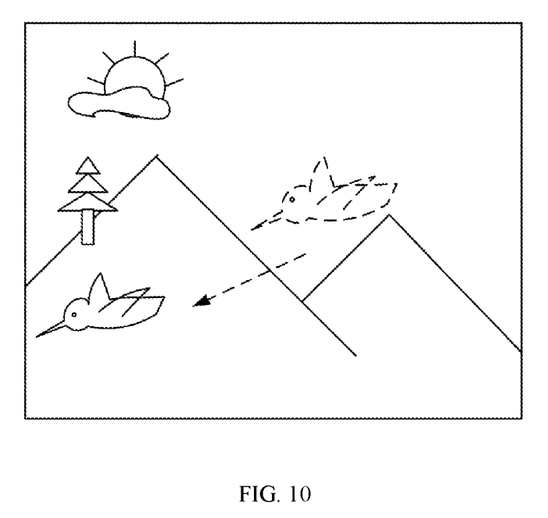
FIG. 10 is a schematic diagram illustrating a seventh image preview method according to an exemplary embodiment of the present disclosure.
Figure 11:
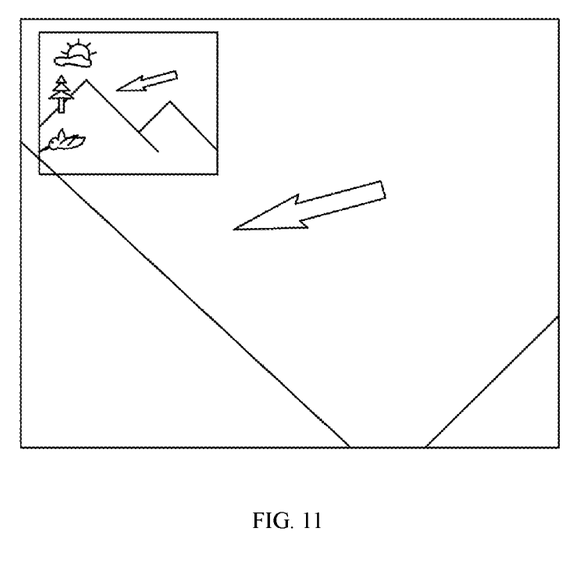
FIG. 11 is a schematic diagram illustrating an eighth image preview method according to an exemplary embodiment of the present disclosure.

If the target object has not moved out of the first image yet, Step 310b is executed at this point to determine whether the target object is about to move out of the first image. As shown in FIG. 10, assuming that the target object has moved to the edge of the first image in a direction indicated by the dotted line, in combination with information such as a moving direction or a speed of the target object, if it is determined at this point that the target object is about to move out of the first image, then Step 312b is executed to determine movement information of the target object. Further, a first prompt message is generated and displayed according to the movement information, i.e., Steps 314b~316b. For example, as shown in FIG. 11, arrows are used in both the first image and the enlarged image area to indicate the user to move the head-mounted device.

It is worth noting that the present disclosure does not limit the sequence of different steps. For example, Steps 310a1 and 310a2 may be performed simultaneously or in a preset sequence. The steps in the above embodiments are only an example of processing logic corresponding to the image preview method provided in the present disclosure. Any modification that does not depart from the spirit and principle of the present disclosure should fall into the protection scope of the present disclosure.

Corresponding to the foregoing method embodiments, this specification also provides embodiments of a device.

Figure 12:
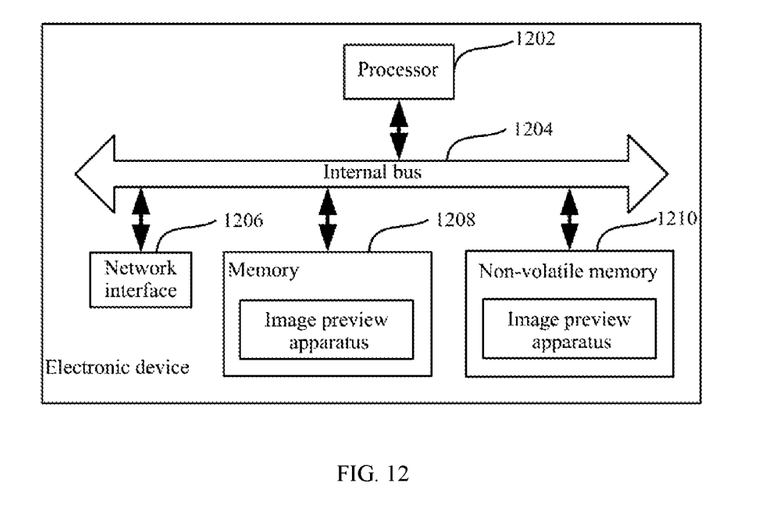
FIG. 12 is a schematic diagram illustrating an electronic device for image previewing according to an exemplary embodiment of the present disclosure.

FIG. 12 is a schematic diagram illustrating an electronic device for image previewing according to an exemplary embodiment of the present disclosure. With reference to FIG. 12, at the hardware level, the electronic device includes a processor 1202, an internal bus 1204, a network interface 1206, a memory 1208, and a non-volatile memory 1210. As a matter of course, hardware required for other services may also be included. The processor 1202 reads a corresponding computer program from the non-volatile memory 1210 and then runs the same in the memory 1208 to form an image preview apparatus at a logical level. As a matter of course, in addition to software implementations, the present disclosure does not exclude other implementations, such as logic devices or a combination of software and hardware, etc. That is to say, the execution body of the following processing flow is not limited to logic units, but may also be hardware or logic devices.

Figure 13:
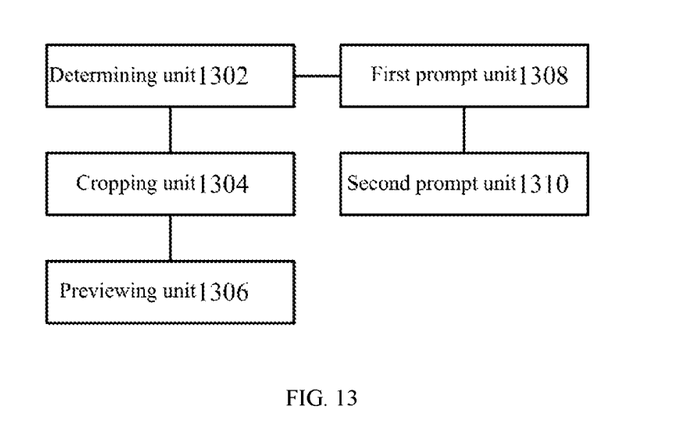
FIG. 13 is a block diagram illustrating an image preview apparatus according to an exemplary embodiment of the present disclosure.

FIG. 13 is a block diagram illustrating an image preview apparatus according to an exemplary embodiment of the present disclosure. With reference to FIG. 13, the apparatus is applied to a head-mounted device provided with a camera. The apparatus includes a determining unit 1302, a cropping unit 1304 and a previewing unit 1306, among them:

the determining unit 1302 is configured to determine a target object contained in a first image captured by the camera;

the cropping unit 1304 is configured to crop an image area containing the target object; and the previewing unit 1306 is configured to enlarge the image area to a predefined preview size, and preview and display the enlarged image area in a shooting preview interface.

In an embodiment, previewing and displaying the image area in the shooting preview interface of the camera includes: displaying the first image while the image area is being displayed, and marking the target object in the first image.

In an embodiment, the apparatus further includes a first prompt unit 1308, which is configured to: determine whether the target object is about to move out of the first image according to movement information of the target object; and generate a first prompt message under a circumstance where that the target object is about to move out of the first image, where the first prompt message is used to indicate such a movement of the head-mounted device that the target object is maintained in the first image.

In an embodiment, the apparatus further includes a second prompt unit 1310, which is configured to: generate a second prompt message under a circumstance where the target object moves out of the first image, where the second prompt message is used to indicate such a movement of the head-mounted device that a first image re-captured by the head-mounted device after the movement contains the target object.

In an embodiment, the generating the second prompt message includes:
acquiring device movement information recorded by a posture sensor carried in the head-mounted device, where the device movement information is used to record a corresponding historical device movement direction of the head-mounted device when the target object moves out of the first image; and
generating the second prompt message containing a first movement direction, where the first movement direction is an opposite direction of the historical device movement direction.

In an embodiment, the generating the second prompt message includes:
acquiring object movement information of the target object, where the object movement information is used to record a corresponding historical object movement direction of the target object when it moves out of the first image; and
generating the second prompt message containing a second movement direction, where the second movement direction is a same direction as the historical object movement direction.

In an embodiment, the generating the second prompt message includes:
acquiring a second image containing the target object under a circumstance where the target object moves out of the first image, where the second image has a wider field of view than that of the first image; and
generating a second prompt message according to the second image.

For the implementation process of the functions and roles of each unit in the above-mentioned apparatus, reference may be made to the implementation process of the corresponding steps in the above-mentioned method for details, which will not be described here again.

For the apparatus embodiments, since they basically correspond to the method embodiments, reference may be made to description part of the method embodiments for relevant portions. The apparatus embodiments described above are only illustrative. The units described as separate parts may or may not be physically separate, and the components presented as units may or may not be physical units, that is, may be located in one position, or may be distributed on multiple network units. A part or all of the modules may be selected according to actual needs to achieve the purpose of the solutions of the present disclosure, and those of ordinary skill in the art can understand and implement them without any creative effort.

In an exemplary embodiment, further provided is a non-transitory computer-readable storage medium including an instruction, such as a memory including an instruction which is executed by a processor of the image preview apparatus to implement the method described in any one of the foregoing embodiments. For example, the method may include:
determining a target object contained in a first image captured by the camera; cropping an image area containing the target object; and enlarging the image area to a predefined preview size, and previewing and displaying the enlarged image area in a shooting preview interface.

The non-transitory computer-readable storage medium may be an ROM, a random access memory (RAM), a CD-ROM, a magnetic tape, a floppy disk, an optical data storage device, etc., which is not limited in the present disclosure.

The above descriptions are only preferred embodiments of the present disclosure, but are not intended to limit the present disclosure. Any modifications, equivalent replacements, improvements, etc., made within the spirit and principle of the present disclosure, should be included in the protection scope of the present disclosure.

What is claimed is:

1. An image preview method applied to a head-mounted device provided with a camera, comprising:
determining a target object contained in a first image captured by the camera;
cropping an image area from the first image, wherein the image area contains the target object; and
enlarging the image area to a predefined preview size, and previewing and displaying the enlarged image area in a shooting preview interface;
wherein previewing and displaying the enlarged image area in the shooting preview interface of the camera comprises:
displaying the first image while the enlarged image area is being displayed, and marking the target object in the first image, wherein a display area of the first image is a changeable area that can be moved or scaled according to a user operation, and the first image is overlaid on the enlarged image area;
wherein the method further comprises:
generating a second prompt message under a circumstance where the target object moves out of the first image, wherein the second prompt message is used to indicate such a movement of the head-mounted device that a first image re-captured by the head-mounted device after the movement contains the target object;
wherein the generating the second prompt message comprises:
acquiring device movement information recorded by a posture sensor carried in the head-mounted device, wherein the device movement information is used to record a corresponding historical device movement direction of the head-mounted device when the target object moves out of the first image; and
generating the second prompt message containing a first movement direction, wherein the first movement direction is an opposite direction of the historical device movement direction;
or,
acquiring object movement information of the target object, wherein the object movement information is used to record a corresponding historical object movement direction of the target object when the target object moves out of the first image; and
generating the second prompt message containing a second movement direction, wherein the second movement direction is a same direction as the historical object movement direction.

2. The method according to claim 1, further comprising:
determining whether the target object is about to move out of the first image according to movement information of the target object; and generating a first prompt message under a circumstance where the target object is about to move out of the first image, wherein the first prompt message is used to indicate such a movement of the head-mounted device that the target object is maintained in the first image.

3. The method according to claim 1, wherein,
the method further comprises: acquiring a second image containing the target object under a circumstance where the target object moves out of the first image, wherein the second image has a wider field of view than that of the first image;
the generating the second prompt message comprises: generating the second prompt message according to the second image.

4. The method according to claim 3, wherein acquiring the second image containing the target object captured by the head-mounted device comprises:
acquiring the second image shot with a relatively wider field of view at a historical moment by a zoom camera currently used by the head-mounted device; wherein the first image is an image captured by the zoom camera with a relatively narrower field of view, and an interval period between the historical moment and the current moment is shorter than a preset period threshold, or a moving distance or a rotation angle generated by the target object and/or the head-mounted device between the historical moment and the current moment is less than a preset threshold.

5. The method according to claim 3, wherein the second image is an image captured by a camera equipped on a further head-mounted device.

6. The method according to claim 5, wherein a successfully established connection is directly used to acquire the second image captured by the further head-mounted device.

7. The method according to claim 5, wherein the method further comprises:
when the target object moves out of the first image captured by the head-mounted device, searching the further head-mounted device in real time and establishing a connection with the further head-mounted device.

8. A non-transitory computer-readable storage medium, storing thereon computer instructions executable by a processor to implement the method according to claim 1.

9. The method according to claim 1, wherein the second prompt message is displayed on the enlarged image area, and the second prompt message is displayed in the first image that is displayed simultaneously with the enlarged image area.

10. The method according to claim 1, wherein the size of the first image is smaller than the enlarged image area.

11. The method according to claim 1, wherein the cropped image area is enlarged to a maximum size of the preview interface.

12. The method according to claim 1, wherein the enlarged image area is displayed in full screen of the shooting preview interface.

13. The method according to claim 1, wherein the method further comprises:
moving, according to the user operation, the display area of the first image from a first position overlaid on the enlarged image area to a second position overlaid on the enlarged image area.

14. An electronic device, comprising:
a processor; and
a memory for storing instructions executable by the processor;
wherein the processor runs the executable instructions to:
determine a target object contained in a first image captured by the camera;
crop an image area from the first image, wherein the image area contains the target object; and
enlarge the image area to a predefined preview size, and preview and display the enlarged image area in a shooting preview interface;
wherein the processor runs the executable instructions to:
display the first image while the enlarged image area is being displayed, and mark the target object in the first image, wherein a display area of the first image is a changeable area that can be moved or scaled according to a user operation, and the first image is overlaid on the enlarged image area;
wherein the processor runs the executable instructions to:
generate a second prompt message under a circumstance where the target object moves out of the first image, wherein the second prompt message is used to indicate such a movement of the head-mounted device that a first image re-captured by the head-mounted device after the movement contains the target object;
wherein the processor runs the executable instructions to:
acquire device movement information recorded by a posture sensor carried in the head-mounted device, wherein the device movement information is used to record a corresponding historical device movement direction of the head-mounted device when the target object moves out of the first image; and
generate the second prompt message containing a first movement direction, wherein the first movement direction is an opposite direction of the historical device movement direction;
or,
acquire object movement information of the target object, wherein the object movement information is used to record a corresponding historical object movement direction of the target object when it the target object moves out of the first image; and
generate the second prompt message containing a second movement direction, wherein the second movement direction is a same direction as the historical object movement direction.

15. The electronic device according to claim 14, wherein the processor runs the executable instructions to:
determine whether the target object is about to move out of the first image according to movement information of the target object; and
generate a first prompt message under a circumstance where the target object is about to move out of the first image, wherein the first prompt message is used to indicate such a movement of the head-mounted device that the target object is maintained in the first image.

16. The electronic device according to claim 14, wherein the processor runs the executable instructions to:
acquire a second image containing the target object under a circumstance where the target object moves out of the first image, wherein the second image has a wider field of view than that of the first image;
generate the second prompt message according to the second image.

* * * * *